(No Model.)
M. A. SUTTON.
PLANT PROTECTOR.
No. 355,282. Patented Dec. 28, 1886.
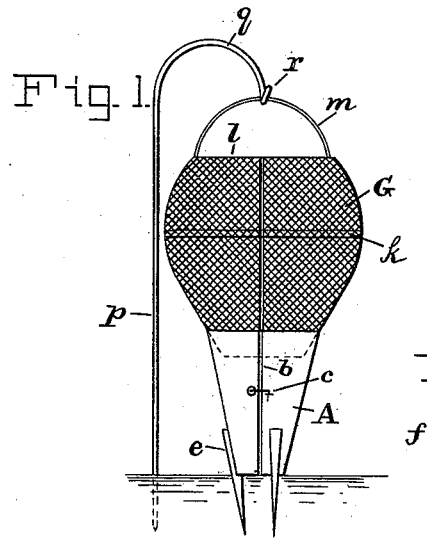
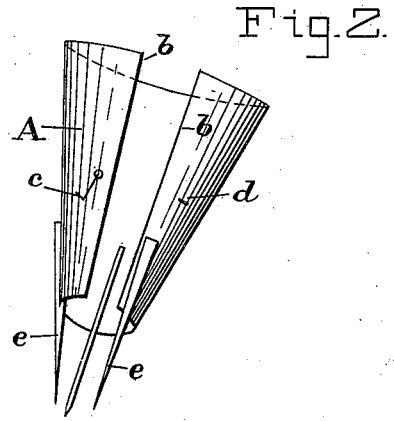
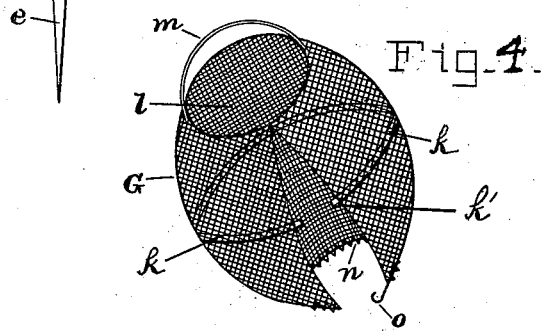
Witnesses:
A. C. Eader
John E. Morris.
Inventor:
M. A. Sutton
By Chas B. Mann
Attorney

UNITED STATES PATENT OFFICE.

MARGRETT A. SUTTON, OF ARLINGTON, MARYLAND.

PLANT-PROTECTOR.

SPECIFICATION forming part of Letters Patent No. 355,282, dated December 28, 1886.

Application filed October 30, 1885. Serial No. 181,363. (No model.)

*To all whom it may concern:*

Be it known that I, MARGRETT A. SUTTON, a citizen of the United States, residing at Arlington, in the county of Baltimore and State of Maryland, have invented certain new and useful Improvements in Plant-Protectors, of which the following is a specification.

My invention relates to a protector for young plants, adapted to shield them from the cut-worm and fly.

The construction and combination whereby the desired result is accomplished will be described in connection with the accompanying drawings, in which—

Figure 1 is a view of the protector as arranged for both cut-worm and fly; Fig. 2, a view of the cut-worm shield in the open or expanded condition; Fig. 3, a view of one of the pins employed to anchor the cut-worm shield; and Fig. 4 is a view of the net-hood, which is employed as a fly-shield, and shows it in the open or expanded condition.

The cut-worm shield A may be made of thin veneer-wood, paper hard-calendered and made water-proof, palm or palmetto leaves, or other suitable material. The blank material in the flat is cut to such shape that when coiled it will form a frustum of a cone or a straight cylinder.

The desired coil or cylindric bend may be imparted to the cut flat blanks by passing them through rollers, the same as is now done with can-bodies. When thus treated, the shield has a certain spring, the tendency of which is to normally incline the shield to remain closed, and by this springy characteristic the two meeting edges, *b*, of the shield may be spread apart, as shown in Fig. 2. A hook, *c*, is suitably fastened near one of these edges, and a hook catch or hole, *d*, is near the other. When the meeting edges are in contact, the point of the hook may enter the said hole, and thus the hook serves to keep the said two edges close together, as in Fig. 1.

The shape of the shield shown in Figs. 1 and 2—that of an inverted frustum of a cone—has an advantage afforded by the swell or spread top part, which is that the large top greatly facilitates the work of placing the shield about plants, and while a shield of this shape is around the plant a person can readily insert his hand down inside of the shield and place the plant in any desired position.

Each shield A has at its bottom two or three pointed wooden pins, *e*. These pins have a slit, *f*, in their upper end, and the slit takes on the lower edge of the shield, as shown in Fig. 2. Thus the shield is seated on these pins. When the pins are stuck in the ground, they serve to anchor or sustain the shield to the desired position.

When setting out plants the hook *c* must be unloosed from the hole *d* and the meeting edges *b* opened or expanded to facilitate placing it about the plant; then, when the plant is set and the pins *e* are properly stuck in the earth, the hook will keep the edges close together.

The net hood G is to protect the leaves and heads of plants from flying insects—such, for instance, as the fly which attacks the cabbage-plant—and this net is designed to co-operate, and is here shown as co-operating, with the stalk-shield. This hood may be made of any suitable netting (such as mosquito-netting) which will afford access to the plant of the desired light and air, and at the same time prevent the destructive fly from reaching it.

The net G in general shape is spherical or bag shape, and at one side and the bottom is open, and at the center and largest part is stretched by a surrounding hoop, *k*, whose two unconnected ends, *k'*, at the open side normally overlap; and while the natural spring in the hoop will retain the ends in that position, they will yield to permit the open side of the net to be spread or expanded, as shown in Fig. 4. The top *l* of the net hood is closed and has a bail, *m*, by which it is supported, and the bottom is open, and the bottom edge is provided with a spiral wire, *n*, and at one corner is a hook, *o*, which, when engaged with the other corner, serves to confine the open bottom about the stalk of a plant. The spiral wire *n* serves to gather or contract the bottom edge about the stalk, but provides for expansion as the stalk grows or enlarges. A hanger-rod, *p*, has its lower end stuck in the ground and stands upright, as shown in Fig. 1. Its upper end, *q*, is curved and projects at one side, and has a hook, *r*, at its extremity. The bail *m* at the top of the net hood is engaged with the hook *r* on the hanger-rod, and thereby the net hood is supported.

It will be understood that where the net hood is supported by the hanger-rod, and for certain plants, the hoop *k*, the spiral wire *n*, and hook *o* may be dispensed with. Instead of the spiral wire and hook, the lower end of the net hood may be confined about the stalk loosely or by an elastic cord.

The cut-worm shield and fly-net hood are both put on the young plant at the same time, and the bottom edge of the net hood has position within the top of the shield A. The shield, by thus surrounding the bottom edge of the hood, serves to keep the same closed and in position, even if no other fastening device for the bottom be used. While the shield A thus supplements the net hood, the latter in turn co-operates with the shield by closing its top, and thereby prevents any insect from having access within. When the plant has become tough by age, the protector may be removed and may be used again on other plants.

Having described my invention, I claim and desire to secure by Letters Patent of the United States—

1. A plant-protector consisting of a shield, A, made of suitable sheet material and coiled to a circular shape to protect the stalk, and a net hood, G, closed at the top and open at the bottom, and located above the said shield with the bottom edge inserted within the top of and surrounded by said shield, as set forth.

2. In a plant-protector, the combination of a shield, A, made of suitable sheet material and coiled to a circular shape to protect the stalk, a net hood, G, closed at the top and open at the bottom, and located above the said shield with the bottom edge inserted within the top of and surrounded by said shield, and a hanger-rod having at its upper end a side projection, from which the top of the net hood is supported, as set forth.

In testimony whereof I affix my signature in presence of two witnesses.

MARGRETT A. SUTTON.

Witnesses:
    JOHN E. MORRIS,
    JNO. T. MADDOX.